(12) United States Patent
Savant

(10) Patent No.: US 9,313,218 B1
(45) Date of Patent: Apr. 12, 2016

(54) SYSTEMS AND METHODS FOR PROVIDING INFORMATION IDENTIFYING THE TRUSTWORTHINESS OF APPLICATIONS ON APPLICATION DISTRIBUTION PLATFORMS

(71) Applicant: Symantec Corporation, Mountain View, CA (US)

(72) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/338,539

(22) Filed: Jul. 23, 2014

(51) Int. Cl.
| G06F 11/00 | (2006.01) |
| H04L 29/06 | (2006.01) |
| G06F 12/14 | (2006.01) |
| G06F 12/16 | (2006.01) |

(52) U.S. Cl.
CPC ........ *H04L 63/1408* (2013.01); *H04L 63/1416* (2013.01)

(58) Field of Classification Search
None
See application file for complete search history.

(56) References Cited

U.S. PATENT DOCUMENTS

| 6,282,709 | B1 | 8/2001 | Reha et al. | |
| 7,305,709 | B1* | 12/2007 | Lymer | G06F 21/56 714/E11.207 |
| 8,499,063 | B1* | 7/2013 | Satish | G06F 8/62 709/220 |
| 9,065,849 | B1* | 6/2015 | Rivera | H04L 63/145 |
| 2006/0242712 | A1 | 10/2006 | Linn et al. | |
| 2006/0253581 | A1* | 11/2006 | Dixon | G06F 17/30861 709/225 |
| 2009/0217370 | A1* | 8/2009 | Hulten | G06F 21/51 726/16 |
| 2009/0328209 | A1* | 12/2009 | Nachenberg | G06F 21/62 726/22 |
| 2010/0005291 | A1* | 1/2010 | Hulten | G06F 21/56 713/156 |
| 2010/0058468 | A1* | 3/2010 | Green | G06F 21/51 726/22 |
| 2010/0077479 | A1* | 3/2010 | Viljoen | G06F 21/577 726/23 |
| 2011/0040825 | A1* | 2/2011 | Ramzan | G06F 21/55 709/203 |
| 2011/0047594 | A1* | 2/2011 | Mahaffey | G06F 21/564 726/1 |
| 2011/0047597 | A1* | 2/2011 | Mahaffey | G06F 21/564 726/3 |
| 2011/0047620 | A1* | 2/2011 | Mahaffey | G06F 21/564 726/23 |
| 2012/0110174 | A1* | 5/2012 | Wootton | G06F 21/564 709/224 |
| 2012/0192275 | A1* | 7/2012 | Oliver | G06F 21/51 726/24 |

(Continued)

OTHER PUBLICATIONS

"Sending Simple Data to Other Apps", http://developer.android.com/training/sharing/send.html, as accessed Jan. 7, 2014, (Jan. 4, 2012).

(Continued)

*Primary Examiner* — Dede Zecher
*Assistant Examiner* — Trang Doan
(74) *Attorney, Agent, or Firm* — ALG Intellectual Property, LLC

(57) ABSTRACT

The disclosed computer-implemented method for providing information identifying the trustworthiness of applications on application distribution platforms may include (1) monitoring event notifications generated by an accessibility service that provides user interface enhancements for disabled individuals on an operating system installed on a computing device, (2) determining, based on an analysis of an event notification generated by the accessibility service, that a user is viewing at least one application for download on an application distribution platform, (3) in response to determining that the user is viewing the application on the application distribution platform, identifying the application based at least in part on an analysis of an active window of the computing device, (4) once the application is identified, retrieving information from a third party that identifies the trustworthiness of the application, and (5) before the user downloads the application, displaying the information identifying the trustworthiness of the application to the user.

20 Claims, 7 Drawing Sheets

(56) References Cited

U.S. PATENT DOCUMENTS

| | | | |
|---|---|---|---|
| 2012/0243043 A1 | 9/2012 | Asai | |
| 2012/0246598 A1* | 9/2012 | Narayanan | G06F 21/64 715/846 |
| 2012/0246630 A1 | 9/2012 | Kuzins et al. | |
| 2013/0097660 A1* | 4/2013 | Das | H04L 63/10 726/1 |
| 2013/0097662 A1* | 4/2013 | Pearcy | G06F 21/577 726/1 |
| 2013/0111547 A1* | 5/2013 | Kraemer | G06F 21/552 726/1 |
| 2013/0254880 A1* | 9/2013 | Alperovitch | H04L 63/1408 726/22 |
| 2013/0283377 A1 | 10/2013 | Das et al. | |
| 2013/0333039 A1 | 12/2013 | Kelly | |
| 2014/0090077 A1 | 3/2014 | Jeong et al. | |
| 2014/0096246 A1 | 4/2014 | Morrissey et al. | |
| 2014/0245376 A1* | 8/2014 | Hibbert | H04L 63/1433 726/1 |

OTHER PUBLICATIONS

"Google Play", http://en.wikipedia.org/wiki/Google_Play, as accessed Jan. 7, 2014, Wikipedia, (Mar. 7, 2012).

Anubhav Savant; Systems and Methods for Informing Users About Applications Available for Download; U.S. Appl. No. 14/178,279, filed Feb. 12, 2014.

Anubhav Savant, et al; Systems and Methods for Modifying Applications Without User Input; U.S. Appl. No. 14/445,704, filed Jul. 29, 2014.

"AccessibilityService", http://developer.android.com/reference/android/accessibilityservice/AccessibilityService.html, as accessed May 30, 2014, Android, (Nov. 15, 2009).

"Digital distribution", http://en.wikipedia.org/wiki/Digital_distribution, as accessed May 30, 2014, Wikipedia, (Jun. 15, 2005).

"Building Accessibility Services", http://developer.android.com/guide/topics/ui/accessibility/services.html, as accessed May 30, 2014, Android (Apr. 14, 2012).

Zeqing Qi, et al; Systems and Methods for Updating Applications; U.S. Appl. No. 14/305,497, filed Jun. 16, 2014.

Anubhav Savant; Systems and Methods for Evaluating Content Provided to Users via User Interfaces; U.S. Appl. No. 14/698,885, filed Apr. 29, 2015.

"ApplicationId versus PackageName", http://tools.android.com/tech-docs/new-build-system/applicationid-vs-packagename, as accessed Mar. 3, 2015, Android Tools Project Site, (Oct. 3, 2014).

Beal, Vangie "API—application program interface", http://www.webopedia.com/TERM/A/API.html, as accessed Mar. 3, 2015, Webopedia, (Jun. 21, 2000).

"AccessibilityEvent", http://developer.android.com/reference/android/view/accessibility/AccessibilityEv ent.html, as accessed Mar. 3, 2015, Android Developers, (Oct. 10, 2009).

"Greenify", https://play.google.com/store/apps/details?id=com.oasisfeng.greenify&hl=en, as accessed May 30, 2014, (Jun. 19, 2013).

"Receiving Simple Data from Other Apps", http://developer.android.com/training/sharing/receive.html, as accessed Jan. 7, 2014, (Jan. 3, 2012).

Christopher Woodward; Systems and Methods for Detecting Advertisements Displayed to Users Via User Interfaces; U.S. Appl. No. 14/812,707, filed Jul. 29, 2015.

Ramakrishnan Meenakshi Sundaram; Systems and Methods for Enabling Parental Control Applications to Enforce Rules on Third-Party Applications; U.S. Appl. No. 14/817,236, filed Aug. 4, 2015.

Jonathon Salehpour; Systems and Methods for Detecting When Users are Uninstalling Applications; U.S. Appl. No. 14/824,539, filed Aug. 12, 2015.

Ramakrishnan Meenakshi Sundaram; Systems and Methods for Protecting Computing Devices From Imposter Accessibility Services; U.S. Appl. No. 14/837,383, filed Aug. 27, 2015.

"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).

"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).

"PackageInstaller", https://developer.android.com/reference/android/content/pm/PackageInstaller.html, as accessed Jun. 25, 2015, Android Developers, (Oct. 20, 2014).

"AccessibilityService", http://developer.android.com/reference/android/accessibilityservice/AccessibilityService.html, as accessed Jun. 25, 2015, Android Developers, (Nov. 15, 2009).

"Developing an Accessibility Service", http://developer.android.com/training/accessibility/service.html, as accessed Jun. 25, 2015, Android Developers, (Apr. 13, 2012).

"AlertDialog", http://developer.android.com/reference/android/app/AlertDialog.html, as accessed Jun. 25, 2015, Android Developers, (Feb. 18, 2009).

"Artimys", https://artimysapi.appspot.com/, as accessed Jun. 4, 2015, (2013).

Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).

"Android.accessibilityservices", https://developer.android.com/reference/android/accessibilityservices/package-summary.html, as accessed Jun. 4, 2015, Android Developers, (Sep. 22, 2009).

Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).

"Adblock Plus", https://adblockplus.org/, as accessed Jun. 4, 2015, (Aug. 21, 2006).

"AccessibilityEvent", http://developer.android.com/reference/android/view/accessibility/AccessibilityEvent.html, as accessed Jun. 4, 2015, Android Developers, (Oct. 10, 2009).

\* cited by examiner

SYSTEMS AND METHODS FOR PROVIDING INFORMATION IDENTIFYING THE TRUSTWORTHINESS OF APPLICATIONS ON APPLICATION DISTRIBUTION PLATFORMS

BACKGROUND

Application distribution platforms often offer a convenient and efficient way for users to discover, browse, and download computer applications. Unfortunately, some application distribution platforms may unknowingly host a variety of malicious and/or illegitimate applications. For example, a malicious application may masquerade as a legitimate application (e.g., by misappropriating the name of legitimate entities and/or displaying false credentials or reviews) in an attempt to lure unsuspecting users to download the same. Unfortunately, even if a malicious application has been previously identified as a security threat by a third-party anti-malware service, application distribution platforms may not have access to this information.

As a result, users of application distribution platforms may be unable to determine the trustworthiness of an application before downloading and/or installing the application onto their computing device. Therefore, application distribution platforms may expose users to malicious software that accesses personal data stored on a computing device, impairs the functionality of a computing device, and/or performs additional harmful behaviors. As such, the current disclosure identifies and addresses a need for more efficient and effective systems and methods for providing information identifying the trustworthiness of applications hosted by application distribution platforms.

SUMMARY

As will be described in greater detail below, the instant disclosure describes various systems and methods for displaying the trustworthiness of applications hosted by application distribution platforms by identifying an application that a user is viewing on an application distribution platform based on an analysis of event notifications generated by an accessibility service provided by the user's computing device. Once the application is identified, the systems and methods described herein may retrieve and display to the user information associated with the reputation of the application.

In one example, a computer-implemented method for performing such a task may include (1) monitoring event notifications generated by an accessibility service that provides user interface enhancements for disabled individuals on an operating system installed on a computing device, (2) determining, based on an analysis of an event notification generated by the accessibility service, that a user is viewing at least one application for download on an application distribution platform, (3) in response to determining that the user is viewing the application on the application distribution platform, identifying the application based at least in part on an analysis of an active window of the computing device, (4) once the application is identified, retrieving information from a third party that identifies the trustworthiness of the application, and (5) before the user downloads the application, displaying the information identifying the trustworthiness of the application to the user.

In some examples, prior to monitoring the event notifications generated by the accessibility, the method may further include prompting the user to enable permissions on the computing device required by the accessibility service. In some embodiments, determining that the user is viewing the application on the application distribution platform may include identifying the application distribution platform. In such embodiments, analyzing the active window may include applying a set of rules to the active window based at least in part on characteristics of the application distribution platform.

In some examples, identifying the application may include identifying a name of the application and/or a publisher of the application. In addition, in some embodiments, analyzing the active window in order to identify the application may include analyzing a layout of the active window and/or content of the active window. Additionally or alternatively, analyzing the active window may include applying a set of rules to the active window based at least in part on characteristics of the computing device. In some examples, the characteristics of the computing device may include the size of the active window on the computing device, the type of the computing device, and/or the operating system installed on the computing system.

In some embodiments, the third party that provides the information identifying the trustworthiness of the application may include an external server that stores information identifying the trustworthiness of a plurality of applications. Additionally, in some examples, the information identifying the trustworthiness of the application may include the results of a malware scan performed on the application, user reviews indicating the performance of the application, and/or user reviews indicating the security of the application.

In one embodiment, a system for implementing the above-described method may include (1) a monitoring module that monitors event notifications generated by an accessibility service that provides user interface enhancements for disabled individuals on an operating system installed on a computing device, (2) a determination module that determines, based on an analysis of an event notification generated by the accessibility service, that a user is viewing at least one application for download on an application distribution platform, (3) an identification module that, in response to determining that the user is viewing the application on the application distribution platform, identifies the application based at least in part on an analysis of an active window of the computing device, (4) a retrieving module that, once the application is identified, retrieves information from a third party that identifies the trustworthiness of the application, and (5) a display module that, before the user downloads the application, displays the information identifying the trustworthiness of the application to the user. In addition, the system may include at least one processor that executes the monitoring module, the determination module, the identification module, the retrieving module, and the display module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor event notifications generated by an accessibility service that provides user interface enhancements for disabled individuals on an operating system installed on a computing device, (2) determine, based on an analysis of an event notification generated by the accessibility service, that a user is viewing at least one application for download on an application distribution platform, (3) in response to determining that the user is viewing the application on the application distribution platform, identify the application based at least in part on an analysis of an active window of the computing device, (4) once the application is identified, retrieve information from a third party that identifies the trustworthiness of the application, and (5) before the user downloads the application, display the information identifying the trustworthiness of the application to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
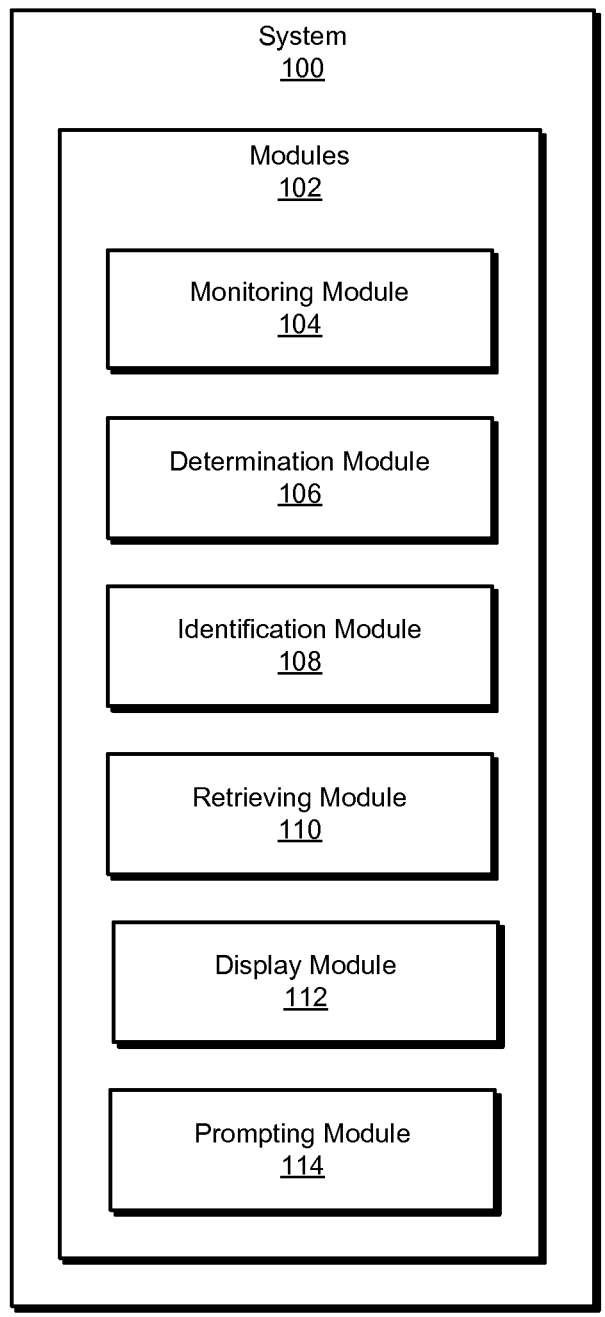
FIG. 1 is a block diagram of an exemplary system for providing information identifying the trustworthiness of applications on application distribution platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing information identifying the trustworthiness of applications on application distribution platforms. As will be explained in greater detail below, by detecting and analyzing event notifications generated by an accessibility service installed a computing device, the disclosed systems and methods may quickly and efficiently determine that a user of the computing device is viewing an application for download on an application distribution platform. In addition, by identifying an application that a user is viewing, the described systems and methods may retrieve information that identifies the reputation of the application that may not otherwise be available to the user. The disclosed systems and method may thus increase the security and safety of a user's computing device by displaying the reputation of an application to a user before the user downloads the application.

The following will provide, with reference to FIGS. 1-2 and 4-5, detailed descriptions of exemplary systems for providing information identifying the trustworthiness of applications on application distribution platforms. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for providing information identifying the trustworthiness of applications on application distribution platforms. As illustrated in this figure, exemplary system 100 may include one or more modules 102 for performing one or more tasks. For example, and as will be explained in greater detail below, exemplary system 100 may include a monitoring module 104 that monitors event notifications generated by an accessibility service that provides user interface enhancements for disabled individuals on an operating system installed on the computing device. Exemplary system 100 may also include a determination module 106 that determines, based on an analysis of an event notification generated by the accessibility service, that a user is viewing at least one application for download on an application distribution platform.

In addition, and as will be described in greater detail below, exemplary system 100 may include an identification module 108 that, in response to determining that the user is viewing the application on the application distribution platform, identifies the application based at least in part on an analysis of an active window of the computing device. Furthermore, exemplary system 100 may include a retrieving module 110 that, once the application is identified, retrieves information from a third party that identifies the trustworthiness of the application. Exemplary system 100 may also include a display module 112 that displays the information identifying the trustworthiness of the application to the user before the user downloads the application. Finally, exemplary system 100 may include a prompting module 114 prompts the user to enable permissions on the computing device required by the accessibility service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
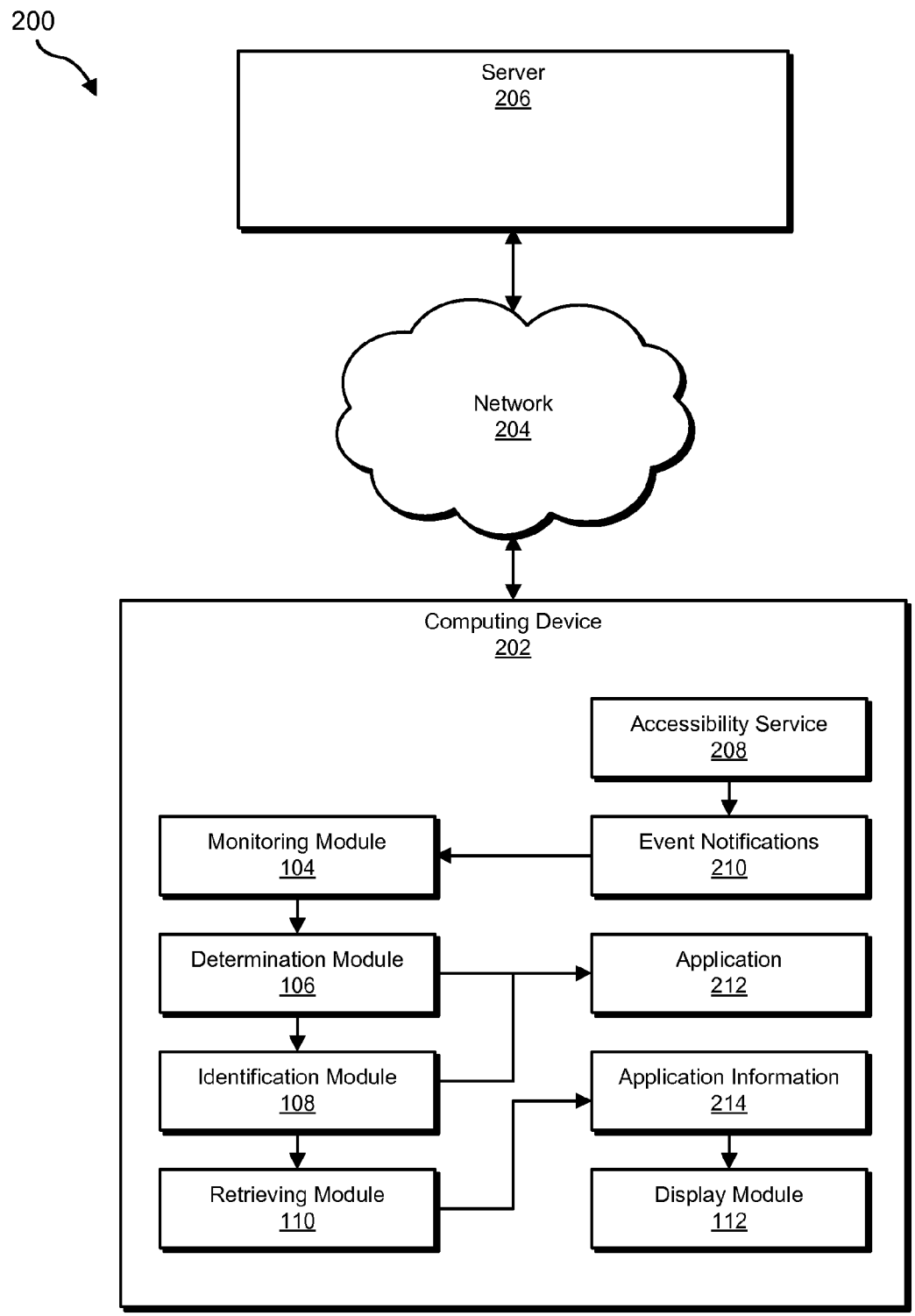
FIG. 2 is a block diagram of an additional exemplary system for providing information identifying the trustworthiness of applications on application distribution platforms.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 in order to detect that a user is viewing an application for download on computing device 202. Additionally or alternatively, server 206 may be programmed with one or more of modules 102 in order to analyze an active window of a computing device and/or retrieve information identifying the trustworthiness of applications stored in server 206.

In one embodiment, one or more of modules 102 from FIG. 1 may, when executed by at least one processor of computing device 202 and/or server 206, enable computing device 202 and/or server 206 to provide information identifying the trustworthiness of applications on application distribution platforms. For example, and as will be described in greater detail below, monitoring module 104 may cause computing device 202 and/or server 206 to monitor event notifications (e.g., event notifications 210) generated by an accessibility service (e.g., accessibility service 208) that provides user interface enhancements for disabled individuals on an operating system installed on a computing device (e.g., computing device 202). In addition, determination module 106 may cause computing device 202 and/or server 206 to determine, based on an analysis of an event notification generated by the accessibility service, that a user is viewing at least one application (e.g., application 212) for download on an application distribution platform.

Next, in response to determining that the user is viewing the application on the application distribution platform, identification module 108 may cause computing device 202 and/or server 206 to identify the application based at least in part on an analysis of an active window of the computing device. In addition, once the application is identified, retrieving module 110 may cause computing device 202 and/or server 206 to retrieve information (e.g., application information 214) from a third party that identifies the trustworthiness of the application. Finally, before the user downloads the application, display module 112 may cause computing device 202 and/or server 206 to display the information identifying the trustworthiness of the application to the user.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of analyzing active windows of computing devices and/or storing information identifying the trustworthiness of applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
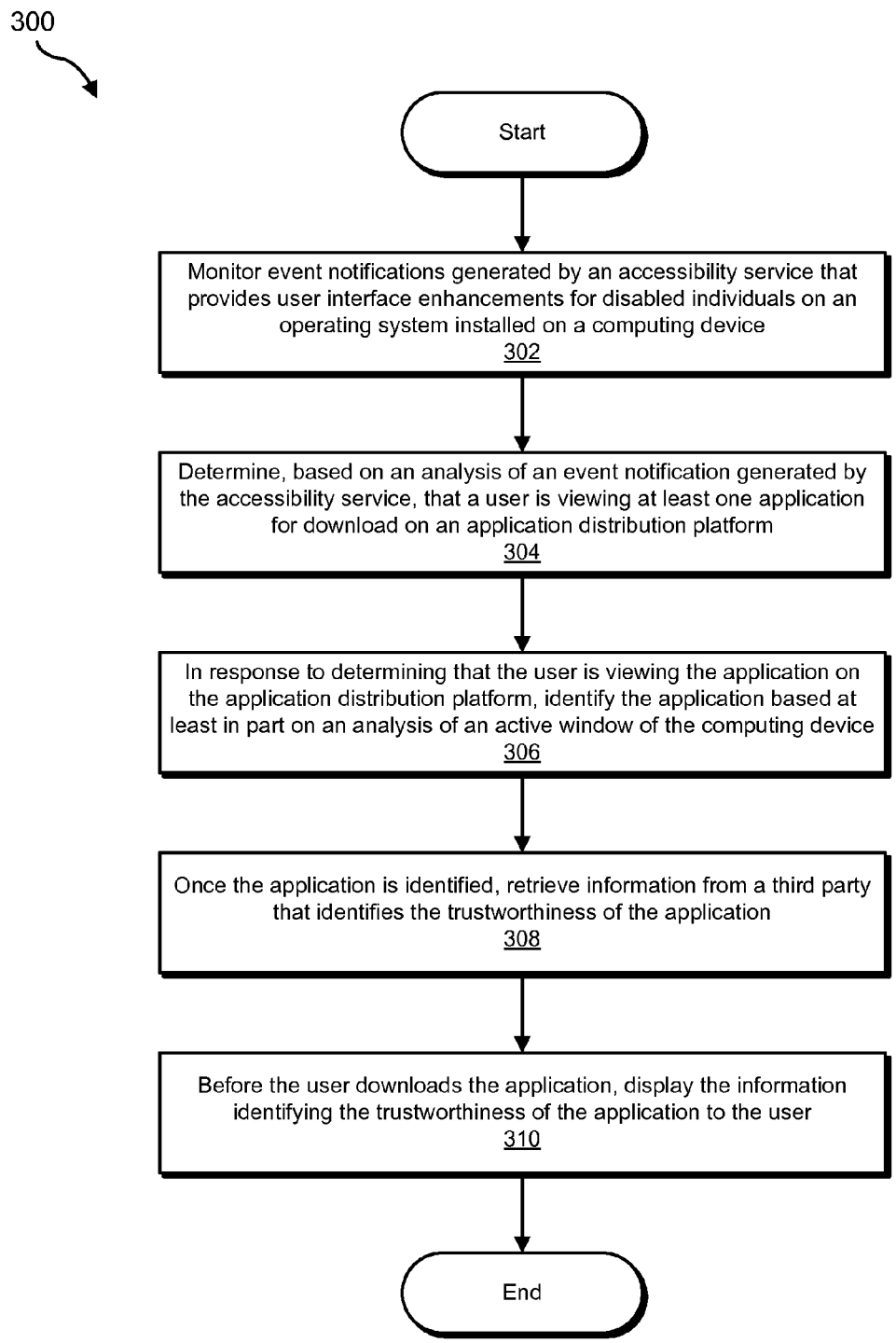
FIG. 3 is a flow diagram of an exemplary method for providing information identifying the trustworthiness of applications on application distribution platforms.

FIG. 3 is a flow diagram of an exemplary computer-implemented method 300 for providing information identifying the trustworthiness of applications on application distribution platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may monitor event notifications generated by an accessibility service that provides user interface enhancements for disabled individuals on an operating system installed on a computing device. For example, monitoring module 104 may, as part of computing device 202 in FIG. 2, monitor event notifications 210 generated by accessibility service 208 on the operating system installed on computing device 202.

The term "accessibility service," as used herein, generally refers to any type or form of application running on a computing device that monitors user interfaces presented to a user of the computing device. In some examples, an accessibility service may monitor user interfaces in order to notify the user of the content of the user interfaces. For example, an accessibility service may assist users with audio or visual impairments (e.g., by reading text displayed on a screen, highlighting or enlarging certain elements of a user interface, etc.). Additionally or alternatively, an accessibility service may assist users who are temporarily unable to fully interact with their computing device.

In some embodiments, an accessibility service may monitor user interfaces by detecting a state transition in a user interface. For example, an accessibility service may detect user interactions with a computing device, such as by detecting that a user has clicked a button, changed the focus of a screen (e.g., by zooming in), entered text into an input field, etc. An accessibility service may also detect changes in user interfaces produced by an application or operating system running on a computing device, such as by determining that an application is executing, identifying a prompt requesting user input, detecting an audio notification, etc.

Specifically, in some examples, an accessibility service may detect changes in user interfaces by receiving event notifications. The term "event notification," as used herein, generally refers to any type or form of electronic message or portion of code distributed to an accessibility service in response to a state transition in one or more user interfaces. In some examples, event notifications may be generated only when an accessibility service and/or certain permissions are enabled on a computing device. In addition, event notifications may contain a variety of information associated with a user interface transition. For example, an event notification may simply alert an accessibility service that a change has occurred. In addition, an event notification may contain information indicating what type of change occurred. As an example, in an ANDROID operating system, an event notification of the type "TYPE_TOUCH_INTERACTION_START" may indicate that a user has begun to touch the touchscreen of a computing device. In addition, an event notification of the type "TYPE_WINDOW_STATE_CHANGED" may indicate that a pop-up window, menu, or dialog box has appeared on the screen of a computing device. Furthermore, in addition to labelling the type of event that occurred in a user interface, an event notification may include information that describes the origin and/or content of the event. For example, an accessibility service may request that an event notification include the time that the event occurred, information about the source of the event, as well as the layout and content of the active window of the computing device at the time the event occurred. The term "active window," as used herein, generally refers to any user interface, notification, or audio-visual display that is currently presented to a user on the screen of a computing device.

The systems described herein may monitor event notifications 210 generated by accessibility service 208 in a variety of ways. In some examples, accessibility service 208 may generate event notifications 210 in response to each change in a user interface of computing device 202. However, in some examples, monitoring module 104 may direct accessibility service 208 to only generate event notifications 210 in response to certain events. For example, monitoring module 104 may trigger accessibility service 208 to generate event notifications 210 in response to a user opening an application, clicking on a link within an application, scrolling through a menu, etc. (i.e., events that may indicate that the user is viewing an application on an application distribution platform). Monitoring module 104 may then identify each of event notifications 210 while and/or after event notifications 210 are sent to accessibility service 208.

Furthermore, in some examples, accessibility service 208 may require certain permissions in order to access and report information associated with event notifications. As such, before monitoring module 104 monitors event notifications 210, prompting module 114 may prompt (e.g., by displaying a pop-up window or notification on the active window of computing device 202) the user to enable permissions required by accessibility service 208.

Returning to FIG. 3, at step 304 one or more of the systems described herein may determine, based on an analysis of an event notification generated by the accessibility service, that a user is viewing at least one application for download on an application distribution platform. For example, determination module 106 may, as part of computing device 202 in FIG. 2, determine that the user is viewing application 212 based on an analysis of one of event notifications 210.

The term "application distribution platform," as used herein, generally refers to any type or form of online service, application, or software framework used to deliver media content to users via a network. Application distribution platforms may distribute a variety of media types, such as text, audio, and video files, gaming applications, security applications, work-related applications, and/or any additional type of media. In addition, application distribution platforms may be used to deliver media to both mobile and non-mobile computing devices. Examples of application distribution platforms include, without limitation, GOOGLE PLAY, AMAZON APPSTORE, WINDOWS STORE, and APP STORE (for iOS).

The systems described herein may analyze the event notification in a variety of ways. In some examples, determination module 106 may analyze the event notification to determine that the user is browsing the application distribution platform without determining that the user is viewing a specific application. In these examples, determination module 106 may identify application 212 as one or more applications that are hosted on the application distribution platform and currently displayed on the active window of computing device 202. In addition, determination module 106 may identify the name (e.g., GOOGLE PLAY, WINDOWS STORE, etc.) and/or type (e.g., mobile or non-mobile) of the application distribution platform. In other examples, determination module 106 may analyze the event notification to determine that the user has selected (e.g., by clicking on) a specific application to view from the application distribution platform.

Determination module 106 may apply a variety of analyses to event notifications 210 in order to determine that the user is browsing the application distribution platform and/or viewing application 212. For example, determination module 106 may identify the package name of the event within event notifications 210 to determine whether the active window described in each event notification is displaying an application distribution platform. In addition, determination module 106 may identify the event type of each of event notifications 210 to identify event notifications that may indicate the user is viewing application 212. Determination module 106 may also analyze information about the source of the event, the content of the active window, and/or any additional information related to the event notification in order to identify an event notification that indicates that the user is browsing the application distribution platform and/or viewing application 212.

Returning to FIG. 3, at step 306 one or more of the systems described herein may, in response to determining that the user is viewing the application on the application distribution platform, identify the application based at least in part on an analysis of an active window of the computing device. For example, identification module 108 may, as part of computing device 202 in FIG. 2, identify application 212 based at least in part on an analysis of the active window of computing device 202.

The systems described herein may identify the application in a variety of ways. In some examples, identification module 108 may identify application 212 by identifying the name of application 212. Additionally or alternatively, identification module 108 may identify the publisher of application 212. Identification module 108 may also identify application 212 by identifying a developer of application 212, a version of application 212, and/or any additional information sufficient to uniquely identify the reputation and/or trustworthiness of application 212.

In some embodiments, identification module 108 may identify application 212 once determination module 106 has determined that the user is browsing the application distribution platform and/or viewing application 212. For example, if the user is browsing the application distribution platform, identification module 108 may identify at least one application that is currently displayed on the active window of computing device 202. In another example, identification module 108 may identify the specific application that the user has selected to view on the application distribution platform.

Identification module 108 may analyze the active window of computing device 202 in a variety of ways. In some examples, identification module 108 may analyze the active window by analyzing a layout and/or content of the active window. For example, identification module 108 may search the images and/or information about the images presented to the user on the screen of computing device 202 for information that identifies application 212. In this example, identification module 108 may receive information about the layout and content of the active window from the event notification and/or by directly analyzing an image of the active window.

Specifically, in some examples, identification module 108 may analyze the layout and content of the active window by applying a set of rules to the active window based at least in part on characteristics of computing device 202. For example, identification module 108 may apply a set of rules to the active window based on the size of computing device 202, the type of computing device 202, the operating system installed on computing device 202, other applications installed on computing device 202, personalized settings applied to computing device 202, and/or any additional characteristics that may influence the placement of information that identifies application 212 on the active window of computing device 202. As an example, a mobile computing device may display the content of an application distribution platform in a different layout than a non-mobile computing device. In addition, an application distribution platform running on small mobile computing device (e.g., a smartphone) may display different content than the same application distribution platform running on a larger mobile computing device (e.g., a tablet). As such, identification module 108 may quickly and efficiently identify application 212 by first identifying and/or analyzing characteristics of computing device 202.

Similarly, if determination module 106 identified the application distribution platform hosting application 212, identification module 108 may analyze the active window by applying a set of rules to the active window based at least in part on characteristics (e.g., name, version, etc.) of the application distribution platform. As an example, one application distribution platform (e.g., GOOGLE PLAY) may display identifying information at a different location on the active window than another application distribution platform (e.g., APP STORE for iOS). As such, identification module 108 may use (alone or in combination with characteristics of computing device 202) the characteristics of the application distribution platform to identify application 212.

In some embodiments, identification module 108 may store and retrieve sets of rules, logic, and/or models for identifying applications that are hosted on different types of computing devices and/or application distribution platforms. For example, in response to identifying characteristics of computing device 202 and/or the application distribution platform hosting application 212, identification module 108 may query an external server (e.g., server 206 in FIG. 2) for information that specifies the location of identifying information on the active window of computing device 202 based on the identified characteristics. In addition, identification 108 may send the identified characteristics and information about the active window of computing device 202 to an external server for analysis.

Figure 4:
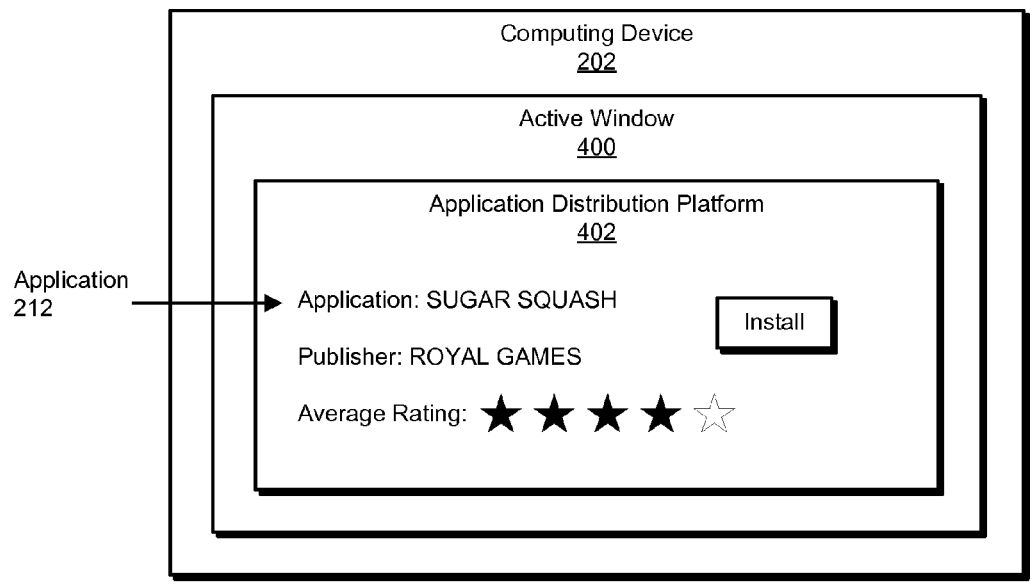
FIG. 4 is an illustration of an exemplary application hosted on an application distribution platform.

As an example of identifying application 212, FIG. 4 shows an exemplary application distribution platform 402 displayed on an active window 400. In this example, identification module 108 may identify characteristics of computing device 202 and/or application distribution platform 402 that indicate where information identifying application 212 may be located on active window 400. Specifically, identification module 108 may determine that the application name is displayed in the upper left hand corner of the active window, with the publisher name directly below the application name. Therefore, identification module 108 may identify the name of application 212 as "SUGAR SQUASH" and the publisher of application 212 as "ROYAL GAMES."

Returning to FIG. 3, at step 308 one or more of the systems described herein may, once the application is identified, retrieve information from a third party that identifies the trustworthiness of the application. For example, retrieving module 110 may, as part of computing device 202 in FIG. 2, retrieve additional information 214 from the third party once application 212 is identified.

The term "trustworthiness," as used herein, generally refers to the safety, security, reputation, presence of malware, and/or performance of an application. In some examples, the trustworthiness of an application may be measured directly (e.g., by scanning the application for malware). In other examples, the trustworthiness of an application may represent an accumulation or average of user reviews or other assessments that describe the performance (e.g., safety and/or functionality) of the application. In general, a "trustworthy" application may represent a safe and/or functional application (e.g., an application with no malware or performance problems). On the other hand, an "untrustworthy" application may represent a potentially harmful application (e.g., an application containing malware or significant performance problems).

The systems described herein may indicate the trustworthiness of application 212 in a variety of ways. For example, application information 214 may represent the results of a malware scan (e.g., "clean," "infected," "quarantined," etc.). Application information 214 may also assign a binary classification to application 212 (e.g., either "trustworthy" or "untrustworthy"). In addition, application information 214 may rate the trustworthiness of application 212 on a numerical scale. In general, application information 214 may represent any additional information associated with the security and/or performance of application 212 that is not already displayed on the application distribution platform.

Retrieving module 110 may retrieve application information 214 in a variety of ways. In some examples, retrieving module 110 may retrieve application information 214 from an external server (e.g., server 206 in FIG. 2) that stores information identifying the trustworthiness of a plurality of applications. For example, the external server may be partially or solely dedicated to providing trustworthiness information for applications hosted on application distribution platforms.

In some embodiments, in addition to or instead of retrieving predetermined trustworthiness information from the external server, retrieving module 110 may identify application information 214 by performing a web search for application information 214. Retrieving module 110 may also direct an anti-malware engine to perform a malware scan on application 212 while the user is viewing application 212 on the application distribution platform. In general, retrieving module 110 may query and/or analyze a variety of sources to identify application information 214. Notably, retrieving module 110 may retrieve application information 214 at any point before the user downloads application 212 such that that user may view application information 214 before deciding whether to download application 212.

Returning to FIG. 3, at step 310 one or more of the systems described herein may, before the user downloads the application, display the information identifying the trustworthiness of the application to the user. For example, before the user downloads application 212, display module 112 may, as part of computing device 202 in FIG. 2, display application information 214 to the user.

Figure 5:
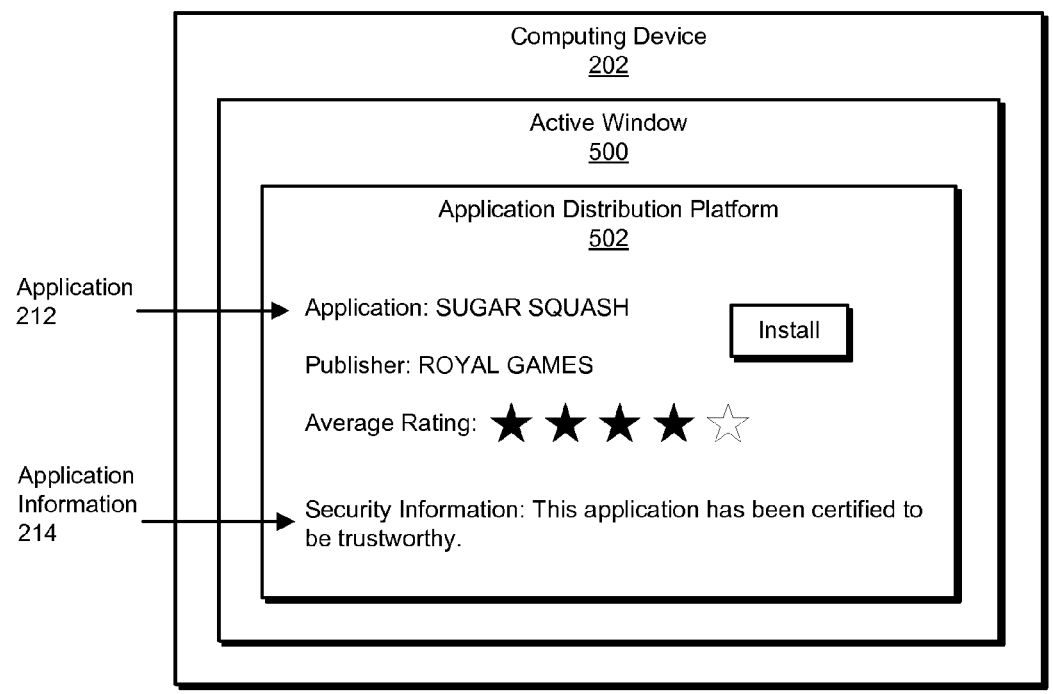
FIG. 5 is an illustration of exemplary information identifying the trustworthiness of an application displayed to a user.

The systems described herein may display the trustworthiness information to the user in a variety of ways. In some examples, display module 112 may display application information 214 within the application distribution platform alongside application 212. For example, display module 112 may seamlessly incorporate application information 214 onto the active window that displays application 212. As an example, FIG. 5 illustrates an application distribution platform 502 displayed on an active window 500. In this example, retrieving module 110 may have retrieved application information 214 that certifies application 212 to be trustworthy. As shown in FIG. 5, application information 214 may be displayed on application distribution platform 502 underneath the application name, publisher, and average user rating.

Additionally or alternatively, display module 112 may display application information 214 in a separate pop-window or dialog box on the active window of computing device 202. In general, display module 112 may present application information 214 to the user in any form of audio-visual notification. Furthermore, display module 112 may identify the source of application information 214 and/or any additional information associated with application information 214 when displaying application information 214.

In addition, display module 112 may display application information 214 to the user at any point before the user downloads application 212. For example, display module 112 may display application information 214 in response to the determination that the user is viewing application 212 (e.g., before the user attempts to download application 212). In another example, display module 112 may display application information 214 after detecting that the user is attempting to download application 212 (e.g., by clicking on an "install" or "download" button) but before the download begins. In this example, the systems described herein may prompt the user to view and accept application information 214 before allowing the download to proceed.

The systems and methods described herein may be implemented in a variety of ways and provide a number of advantages. As was explained above, by detecting and analyzing event notifications generated by an accessibility service installed a computing device, the disclosed systems and methods may quickly and efficiently determine that a user of the computing device is viewing an application for download on an application distribution platform. In addition, by identifying an application that a user is viewing, the described systems and methods may retrieve information associated with the reputation of the application that may not otherwise be available to the user. Furthermore, the disclosed systems and method may increase the security and safety of a user's computing device by displaying the reputation of an application to a user before the user downloads the application.

Figure 6:
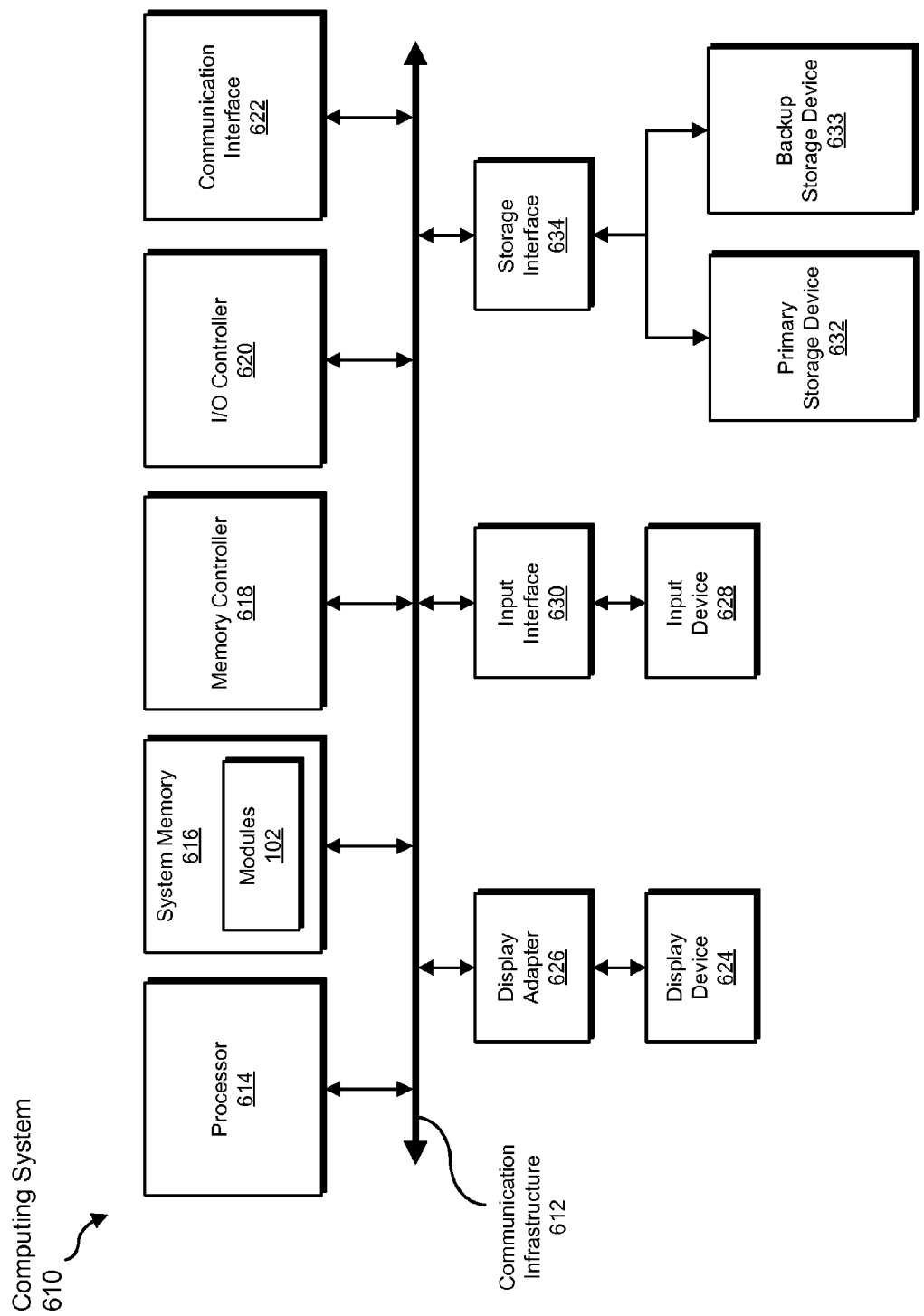
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
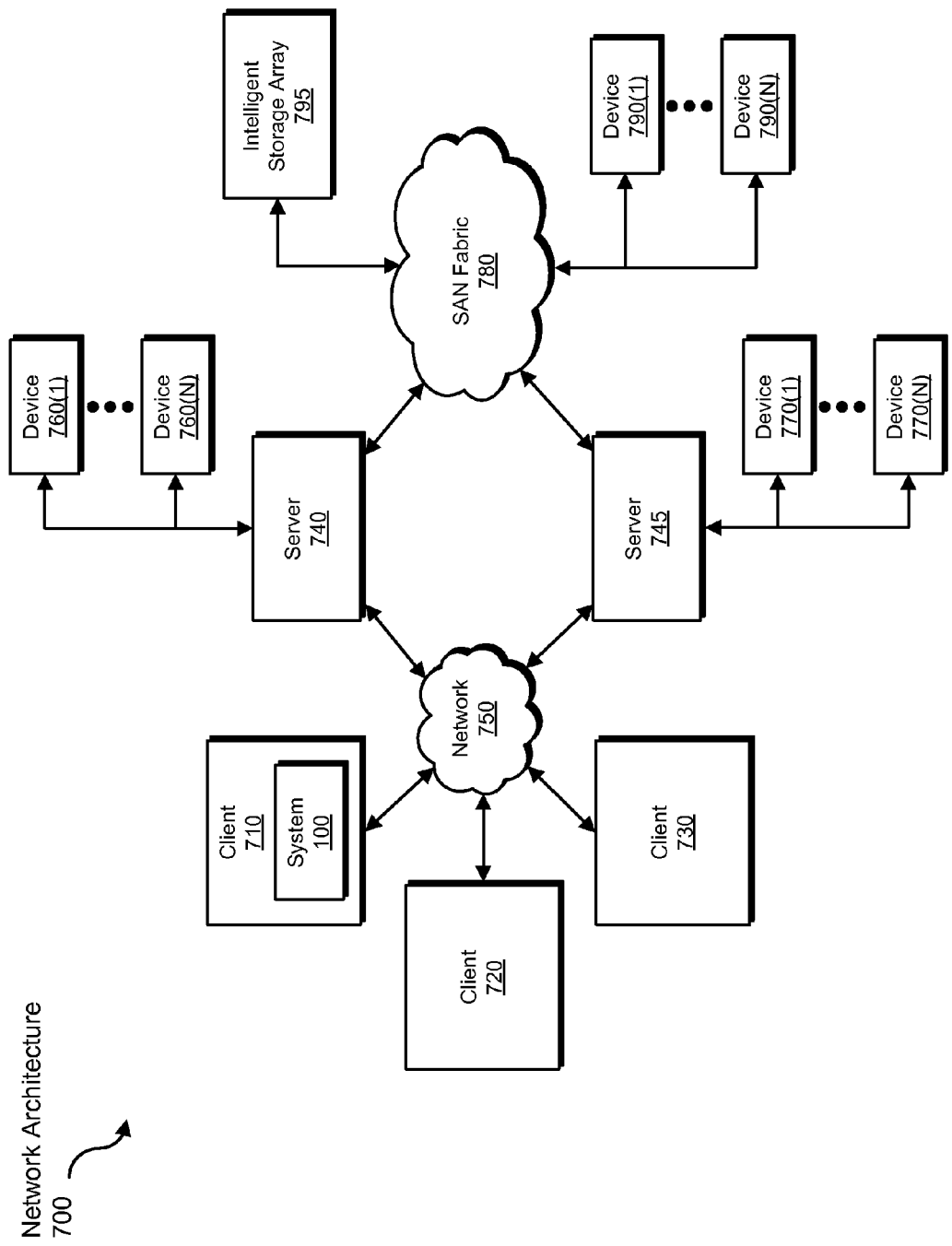
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing information identifying the trustworthiness of applications on application distribution platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive event notifications generated by an accessibility service, transform the event notifications into information that identifies an application, use the information that identifies the application to obtain trustworthiness information about the application, and output the trustworthiness information to a user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing information identifying the trustworthiness of applications on application distribution platforms, at least a portion of the method being performed by a computing device comprising at least one processor, the method comprising:
   monitoring event notifications generated by an accessibility service that provides user interface enhancements for disabled individuals on an operating system installed on the computing device;
   determining, based on an analysis of an event notification generated by the accessibility service, that a user is viewing at least one application for download on an application distribution platform;
   in response to determining that the event notification generated by the accessibility service indicates that the user is viewing the application on the application distribution platform, identifying the application that the user is viewing by applying a set of rules based on characteristics of the computing device to content of an active window that is currently displayed on a screen of the computing device in order to search for an indication of a name of the application;
   once the application is identified, retrieving information from a third party that identifies the trustworthiness of the application;
   before the user downloads the application, displaying the information identifying the trustworthiness of the application to the user.

2. The computer-implemented method of claim 1, further comprising, prior to monitoring the event notifications generated by the accessibility service, prompting the user to enable permissions on the computing device required by the accessibility service.

3. The computer-implemented method of claim 1, wherein:
   determining that the user is viewing the application on the application distribution platform comprises identifying the application distribution platform;
   analyzing the active window comprises applying a set of rules to the active window based at least in part on characteristics of the application distribution platform.

4. The computer-implemented method of claim 1, wherein identifying the application comprises identifying at least one of:
   a name of the application;
   a publisher of the application.

5. The computer-implemented method of claim 1, wherein analyzing the active window comprises analyzing at least one of:
   a layout of the active window;
   content of the active window.

6. The computer-implemented method of claim 1, wherein analyzing the active window comprises applying a set of rules to the active window based at least in part on characteristics of the computing device.

7. The computer-implemented method of claim 6, wherein the characteristics of the computing device comprise at least one of:
   the size of the active window on the computing device;
   a type of the computing device;
   the operating system installed on the computing device.

8. The computer-implemented method of claim 1, wherein the third party that provides the information identifying the trustworthiness of the application comprises an external server that stores information identifying the trustworthiness of a plurality of applications.

9. The computer-implemented method of claim 1, wherein the information identifying the trustworthiness of the application comprises at least one of:
- results of a malware scan performed on the application;
- user reviews indicating the performance of the application;
- user reviews indicating the security of the application.

10. A system for providing information identifying the trustworthiness of applications on application distribution platforms, the system comprising:
- a monitoring module, stored in memory, that monitors event notifications generated by an accessibility service that provides user interface enhancements for disabled individuals on an operating system installed on a computing device;
- a determination module, stored in memory, that determines, based on an analysis of an event notification generated by the accessibility service, that a user is viewing at least one application for download on an application distribution platform;
- an identification module, stored in memory, that in response to determining that the event notification generated by the accessibility service indicates that the user is viewing the application on the application distribution platform, identifies the application that the user is viewing by applying a set of rules based on characteristics of the computing device to content of an active window that is currently displayed on a screen of the computing device in order to search for an indication of a name of the application;
- a retrieving module, stored in memory, that once the application is identified, retrieves information from a third party that identifies the trustworthiness of the application;
- a display module, stored in memory, that before the user downloads the application, displays the information identifying the trustworthiness of the application to the user;
- at least one hardware processor that executes the monitoring module, the determination module, the identification module, the retrieving module, and the display module.

11. The system of claim 10, further comprising a prompting module that, prior to monitoring the event notifications generated by the accessibility service, prompts the user to enable permissions on the computing device required by the accessibility service.

12. The system of claim 10, wherein:
- the determination module determines that the user is viewing the application on the application distribution platform by identifying the application distribution platform;
- the determination module analyzes the active window by applying a set of rules to the active window based at least in part on characteristics of the application distribution platform.

13. The system of claim 10, wherein the identification module identifies the application by identifying at least one of:
- a name of the application;
- a publisher of the application.

14. The system of claim 10, wherein the determination module analyzes the active window by analyzing at least one of:
- a layout of the active window;
- content of the active window.

15. The system of claim 10, wherein the determination module analyzes the active window by applying a set of rules to the active window based at least in part on characteristics of the computing device.

16. The system of claim 15, wherein the characteristics of the computing device comprise at least one of:
- the size of the active window on the computing device;
- a type of the computing device;
- the operating system installed on the computing device.

17. The system of claim 10, wherein the third party that provides the information identifying the trustworthiness of the application comprises an external server that stores information identifying the trustworthiness of a plurality of applications.

18. The system of claim 10, wherein the information identifying the trustworthiness of the application comprises at least one of:
- results of a malware scan performed on the application;
- user reviews indicating the performance of the application;
- user reviews indicating the security of the application.

19. A non-transitory computer-readable medium comprising one or more computer-executable instructions that, when executed by at least one processor of a computing device, cause the computing device to:
- monitor event notifications generated by an accessibility service that provides user interface enhancements for disabled individuals on an operating system installed on the computing device;
- determine, based on an analysis of an event notification generated by the accessibility service, that a user is viewing at least one application for download on an application distribution platform;
- in response to determining that the event notification generated by the accessibility service indicates that the user is viewing the application on the application distribution platform, identify the application that the user is viewing by applying a set of rules based on characteristics of the computing device to content of an active window that is currently displayed on a screen of the computing device in order to search for an indication of a name of the application;
- once the application is identified, retrieve information from a third party that identifies the trustworthiness of the application;
- before the user downloads the application, display the information identifying the trustworthiness of the application to the user.

20. The non-transitory computer-readable medium of claim 19, wherein the computer-executable instructions cause the computing device to analyze the active window by applying a set of rules to the active window based at least in part on characteristics of the computing device.

\* \* \* \* \*